(12) United States Patent
Kakadia et al.

(10) Patent No.: US 8,964,562 B2
(45) Date of Patent: Feb. 24, 2015

(54) FLOW CONTROL METHODS AND SYSTEMS FOR USE WITH A WIRELESS NETWORK

(71) Applicants: Verizon Patent and Licensing Inc., Arlington, VA (US); Cellco Partnership, Basking Ridge, NJ (US)

(72) Inventors: Deepak Kakadia, Union City, CA (US); Haim S. Ner, Fair Lawn, NJ (US); Sagiv Draznin, Walnut Creek, CA (US); Emerando M. Delos Reyes, Pleasant Hill, CA (US); Donna L. Polehn, Kirkland, WA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 143 days.

(21) Appl. No.: 13/732,137

(22) Filed: Dec. 31, 2012

(65) Prior Publication Data

US 2014/0185452 A1 Jul. 3, 2014

(51) Int. Cl.
*H04L 12/26* (2006.01)
*H04W 28/12* (2009.01)
(52) U.S. Cl.
CPC .................................... *H04W 28/12* (2013.01)
USPC ...................................... 370/236; 370/230.1

(58) Field of Classification Search
USPC ............................................... 370/236, 230.1
See application file for complete search history.

(56) References Cited

U.S. PATENT DOCUMENTS

| 7,133,361 | B2 * | 11/2006 | Olariu et al. | 370/230 |
|---|---|---|---|---|
| 7,237,007 | B2 * | 6/2007 | Kamath et al. | 709/206 |
| 2004/0027997 | A1 * | 2/2004 | Terry et al. | 370/276 |
| 2013/0163428 | A1 * | 6/2013 | Lee et al. | 370/235 |
| 2013/0223217 | A1 * | 8/2013 | Turner et al. | 370/231 |
| 2014/0098668 | A1 * | 4/2014 | Kakadia et al. | 370/235 |
| 2014/0119182 | A1 * | 5/2014 | Kakadia et al. | 370/235 |
| 2014/0126379 | A1 * | 5/2014 | Calo et al. | 370/237 |

* cited by examiner

*Primary Examiner* — Jason Mattis (57) ABSTRACT

An exemplary method includes an interface device 1) detecting a request provided by a user device for a server to transmit data to the user device by way of a base station and a wireless network that connects the user device to the base station, 2) pre-fetching, in response to the request, the data from the server, 3) transmitting the pre-fetched data to the base station for forwarding by the base station to the user device by way of the wireless network, 4) dynamically receiving, as the interface system transmits the pre-fetched data to the base station, queue occupancy information from the base station, and 5) using the queue occupancy information to perform flow control with respect to the transmission of the pre-fetched data by the interface system to the base station. Corresponding methods and systems are also disclosed.

20 Claims, 10 Drawing Sheets

Fig. 10

FLOW CONTROL METHODS AND SYSTEMS FOR USE WITH A WIRELESS NETWORK

BACKGROUND INFORMATION

Transmission Control Protocol ("TCP") is a commonly used protocol in the Internet Protocol ("IP") suite that provides transport layer data transmission services to application programs. For example, a TCP socket may interface with an application program to receive or send a byte stream of application layer data by segmenting the data based on maximum TCP segment sizes configured by the operating system and sending the segmented data to a network layer (e.g., an IP network layer).

Network congestion, traffic load balancing, or other unpredictable network behavior may result in some IP packets being lost, duplicated, or delivered out of order. TCP components can detect these problems, request retransmission of lost data, and rearrange out-of-order data. Additionally, TCP components may implement congestion control mechanisms to help minimize network congestion.

Existing TCP congestion control mechanisms (e.g., slow start mechanisms) are designed for wireline networks, which typically have fixed network capacities and predictable behavior. Unfortunately, these congestion control mechanisms do not work well for wireless networks, which may experience rapid fluctuations in network capacity. This is because existing TCP congestion control mechanisms cannot detect such fluctuations fast enough to adequately compensate for them. As a result, the network capacity of wireless networks is often underutilized.

Currently available TCP acceleration devices typically use a proxy based approached where both ends of a TCP socket are terminated. These TCP acceleration devices attempt to improve throughput by using different TCP implementations optimized for the wireless network. This is problematic because of latency and scaling issues and still uses TCP to make estimates of the wireless network capacity at any given time. Such estimates are often too slow to respond to sudden fluctuations in the wireless network capacity.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Flow control methods and systems for use with a wireless network are described herein. For example, as will be described in more detail below, an interface system may 1) detect a request provided by a user device for a server to transmit data to the user device by way of a base station and a wireless network that connects the user device to the base station, 2) pre-fetch, in response to the request, the data from the server, 3) transmit the pre-fetched data to the base station for forwarding by the base station to the user device by way of the wireless network, 4) dynamically receive, as the interface system transmits the pre-fetched data to the base station, queue occupancy information from the base station, the queue occupancy information indicative of a congestion level of a queue used by the base station to buffer the pre-fetched data prior to forwarding the pre-fetched data to the user device by way of the wireless network, and 5) use the queue occupancy information to perform flow control with respect to the transmission of the pre-fetched data by the interface system to the base station.

To illustrate, a user device (e.g., a mobile device such as a mobile phone or tablet computer) may request data (e.g., a file, streaming media content, etc.) from a server (e.g., a web server) by way of a TCP transport channel. The TCP transport channel may include a radio active network (RAN") segment that interconnects the user device with a base station (e.g., an evolved node B ("eNodeB") device) and one or more wireline network segments that interconnect the base station with the server. Because the RAN segment is wireless, its network capacity may fluctuate rapidly and often.

Such fluctuations in network capacity may be problematic when a conventional slow start congestion control mechanism is used to control network congestion of the RAN (and other types of wireless networks). To illustrate, a conventional slow start congestion control mechanism resets the TCP congestion window each time a packet of data is lost during transmission from the server to the user device. As used herein, a "TCP congestion window" specifies the number of bytes that can be transmitted and outstanding at any time by a TCP sender (e.g., the server) before an acknowledgment message is received from a TCP receiver (e.g., the user device). The TCP congestion window is then increased over time until another packet of data is lost. Unfortunately, the fluctuations in network capacity of the RAN may cause a conventional slow start congestion control mechanism to repeatedly reset the TCP congestion window. Because it takes a relatively long time for the TCP congestion window to be increased subsequent to being reset, the conventional slow start congestion control mechanism may not take advantage of a sudden increase in network capacity of the RAN. As a result, a significant portion of the network capacity of the RAN may not be used at any given time, thereby resulting in relatively low throughput and poor network performance.

In contrast, the methods and systems described herein utilize queue occupancy information provided by the base station to more accurately track the network capacity of the RAN and thereby more efficiently perform congestion control (also referred to herein as "flow control") with respect to the data being provided to the user device. As mentioned, the queue occupancy information is indicative of a congestion level of a queue used by the base station to buffer data (i.e., data provided by the server) prior to forwarding the data to the user device by way of the RAN.

To illustrate, in response to the request provided by the user device for the server to transmit data to the user device by way of the TCP transport channel, the interface system may prefetch the data from the server (e.g., by way of a wireline network segment that interconnects the interface system and the server). The interface system may then transmit, in accordance with a flow control heuristic that is based on the queue occupancy information provided by the base station, the prefetched data to the base station for forwarding to the user device. For example, the interface system may dynamically increase a rate at which the pre-fetched data is transmitted to the base station if the queue occupancy information indicates that the congestion level of the queue has fallen beneath a predetermined threshold level. As another example, the interface system may dynamically decrease a rate at which the pre-fetched data is transmitted to the base station if the queue occupancy information indicates that the congestion level of the queue has risen above a predetermined threshold level. In this manner, the interface system may ensure that the queue is not overfilled or underfilled, thereby allowing the base station to take advantage of the available network capacity of the RAN at any given time. This may advantageously increase network throughput of the RAN, facilitate increased data transmission speeds, and improve overall network performance compared to conventional congestion control mechanisms.

Figure 1:
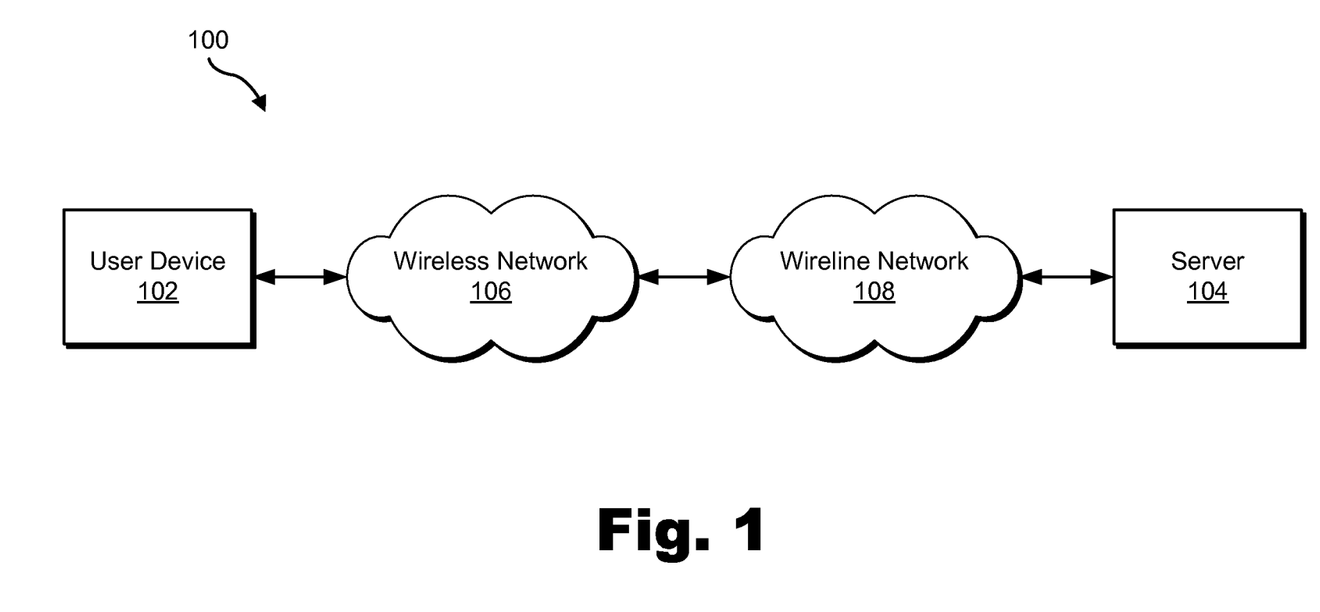
FIG. 1 illustrates an exemplary environment in which the systems and/or methods described herein may be implemented.

FIG. 1 illustrates an exemplary environment 100 in which the systems and/or methods described herein may be implemented. As shown, environment 100 may include a user device 102 communicatively coupled to a server 104 by way of a wireless network 106 and a wireline network 108.

User device 102 may be implemented by any computing device configured to wirelessly communicate with one or more other computing devices (e.g., server 104). For example, user device 102 may include a mobile or wireless device (e.g., a mobile phone and/or a tablet computer), a personal computer, a set-top box device, a digital video recorder ("DVR") device, a personal-digital assistant device, a gaming device, a television device, and/or any other suitable computing device configured to wirelessly communicate with server 104.

Server 104 may be implemented by one or more computing devices configured to provide data to user device 102 by way of networks 106 and 108. For example, server 104 may maintain data (e.g., in the form of one or more files) that may be downloaded by user device 102, provide one or more network services to user device 102 (e.g., one or more media streaming services such as one or more video streaming services), web services, communication services, voicemail services, data routing services, transcoding services, and/or any other type of network service as may serve a particular implementation, and/or otherwise interface with user device 102.

Wireless network 106 may include any suitable wireless network. For example, wireless network 106 may include a RAN that is a part of a cellular network, such as a long term evolution ("LTE") network. Wireline network 108 may include any suitable wireline network. For example, wireline network 108 may include a core network, a cable network, an optical fiber network, a hybrid fiber coax network, a wide area network ("WAN"), the Internet, and/or any combination or sub-combination of these networks. Networks 106 and 108 (and one or more network components that provide networks 106 and 108) may be associated with (e.g., provided and/or managed by) a network service provider (e.g., a wireless network service provider, an Internet service provider, etc.).

User device 102 and server 104 may communicate with one another by way of networks 106 and 108 using any suitable communication technologies, devices, media, and protocols supportive of data communications, including, but not limited to, socket connections, Ethernet, data bus technologies, data transmission media, communications devices, TCP, IP, File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Figure 2:
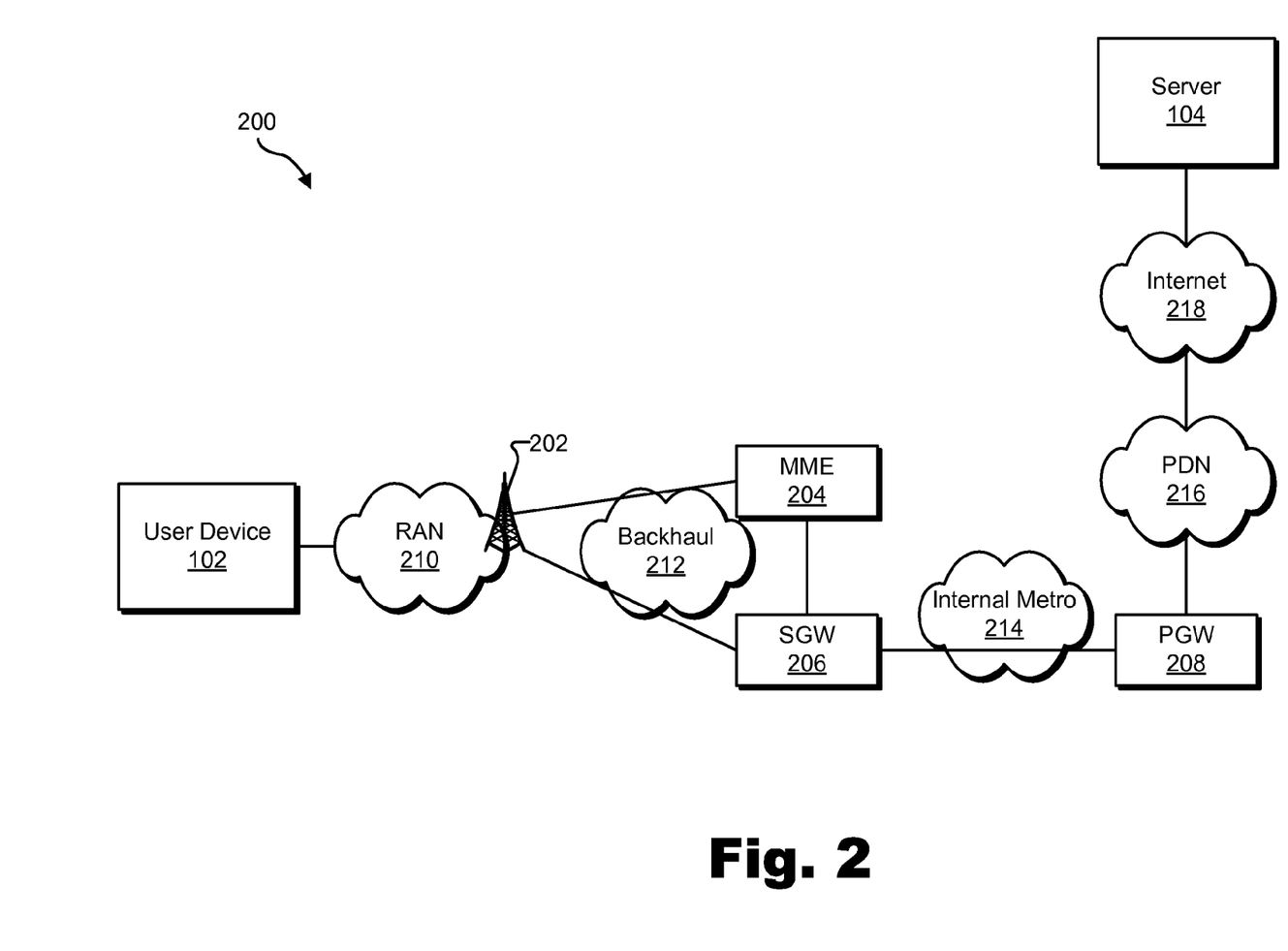
FIG. 2 shows an exemplary implementation of the environment of FIG. 1 according to principles described herein.

FIG. 2 shows an exemplary implementation 200 of environment 100. As shown, implementation 200 may include a number of network elements. For example, implementation 200 may include a base station 202, a mobility management entity ("MME") 204, a serving gateway ("SOW") 206, and a packet data network gateway ("PGW") 208. In some examples, these network elements may be a part of a LTE network.

Base station 202 may be configured to provide a radio interface (i.e., RAN 210) over which base station 202 may communicate with user device 102. For example, base station 202 may be implemented by an eNodeB device configured to maintain one or more queues of data provided by server 104 and to forward the queued data to user device 102 as the network capacity of RAN 210 permits.

MME 204 may include one or more computing devices configured to perform signaling for one or more components of wireline network 104. MME 204 may, for example, be responsible for authenticating user devices (e.g., user device 102), maintaining location information for the user devices, and selecting a PGW 208 to service a particular user device. SGW 206 may include one or more computing devices configured to route and forward user data packets. SGW 206 may also serve as a mobility anchor during inter-base station handoffs. PGW 208 may include one or more computing devices configured to provide connectivity from user device 102 to one or more external packet data networks (e.g., packet data network ("PDN") 216).

Base station 202, MME 204, SGW 206, and PGW 208 may be connected to one another, and to other devices, through one or more networks that implement wireless network 106 and wireline network 108. For example, RAN 210 may implement wireless network 106 and may be configured to facilitate wireless communication between user device 102 and server 104. Wireline network 108 may be implemented by a backhaul network 212, an internal metro network 214, and a wide area network ("WAN") network 216. Backhaul network 212 may include, for example, an Ethernet backhaul network and may connect base station 202 to SGW 206. Internal metro network 214 may include a service provider metro network or high speed optical core network, for example, and may be used to transport traffic between SGW 206 and PGW 208. PDN 216 may include any suitable external packet data network (e.g., any public or private network) and may transport traffic between PGW 208 and server 104 by way of the Internet 218. Each network illustrated in FIG. 2 may be referred to herein as a "network segment" of a transport channel (e.g., a TCP transport channel) that may be used to transmit data between user device 102 and server 104.

It will be recognized that implementation 200 is merely illustrative of the many different implementations of environment 100 that may be realized in accordance with the systems and methods described herein. Additional or alternative network elements and/or network segments to those shown in FIG. 2 may be realized in accordance with the systems and methods described herein.

Figure 3:
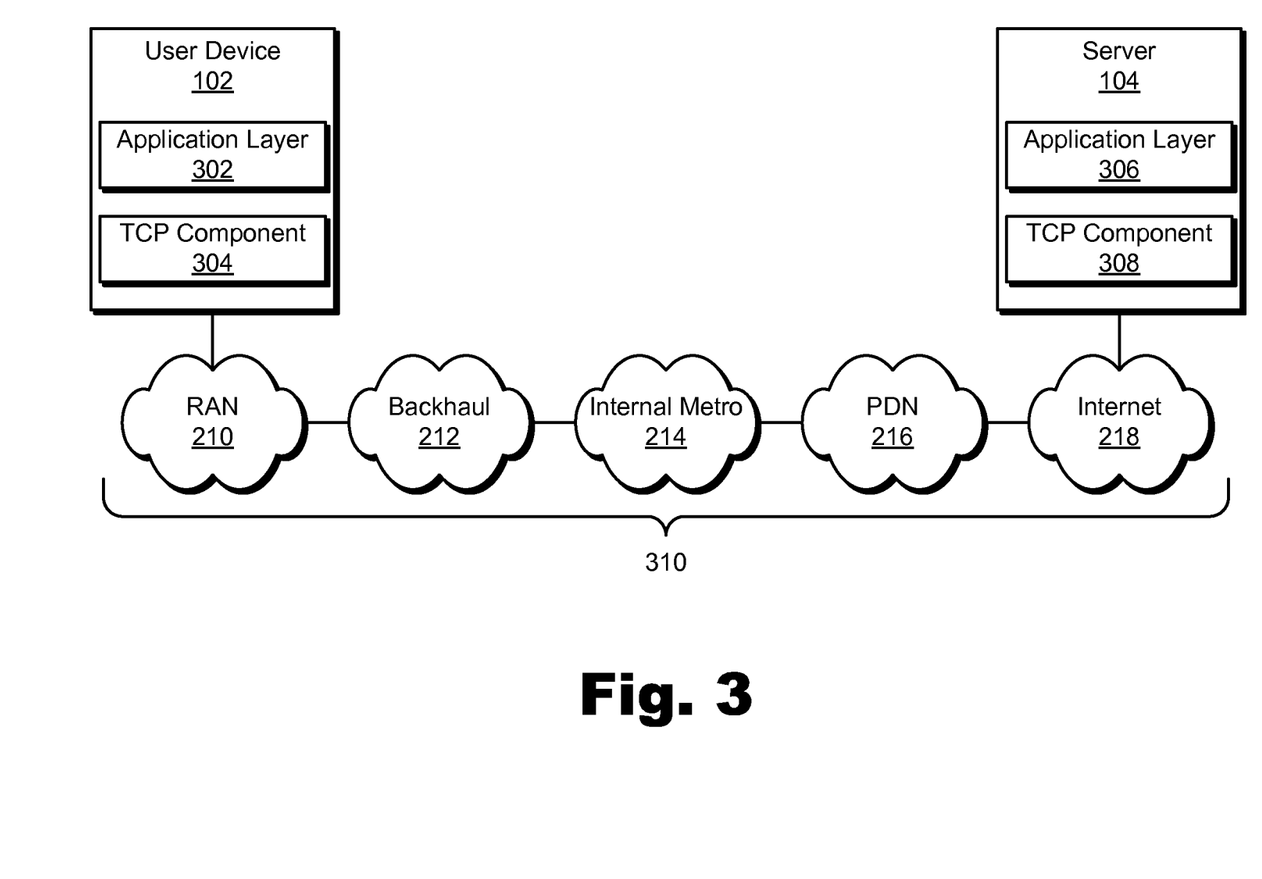
FIG. 3 is a diagram illustrating an example of functional components involved in communications performed using the TCP protocol in the environment of FIG. 1 according to principles described herein.

FIG. 3 is a diagram illustrating an example of functional components involved in communications performed using the TCP protocol in environment 100. In FIG. 3, user device 102 and server 104 each include an application layer and a TCP component. For example, user device 102 includes application layer 302 and TCP component 304, and server 104 includes application layer 306 and TCP component 308. Application layers 302 and 306 may communicate with each other utilizing TCP components 304 and 308 by way of a TCP transport channel 310, which will be described in more detail below.

Application layer 302, at user device 102, and application layer 306, at server 104, may represent one or more applications, such as applications that require network services. For example, at user device 102, application layer 302 may represent one or more applications, such as a web browser or other program, that use transport layer network services, such as TCP. At server 104, application layer 306 may represent one or more applications, such as one or more web server applications or other programs, that also use transport layer network services, such as TCP.

TCP component 304 and TCP component 308 may provide TCP services for user device 102 and server 104, respectively. During a TCP session, TCP component 304 and TCP component 308 may communicate with one another, based on the TCP protocol, to provide reliable, ordered delivery of traffic over transport channel 310.

TCP Transport channel 310 may conceptually represent a number of different physical network segments. For example, TCP transport channel 310 may be made up of the various network segments described in FIG. 2 (e.g., network segments 210-218). The various network segments may have different properties relating to reliability and latency. The RAN segment 210, for example, may be particularly subject to rapid variability in the quality of its radio link.

Figure 4:
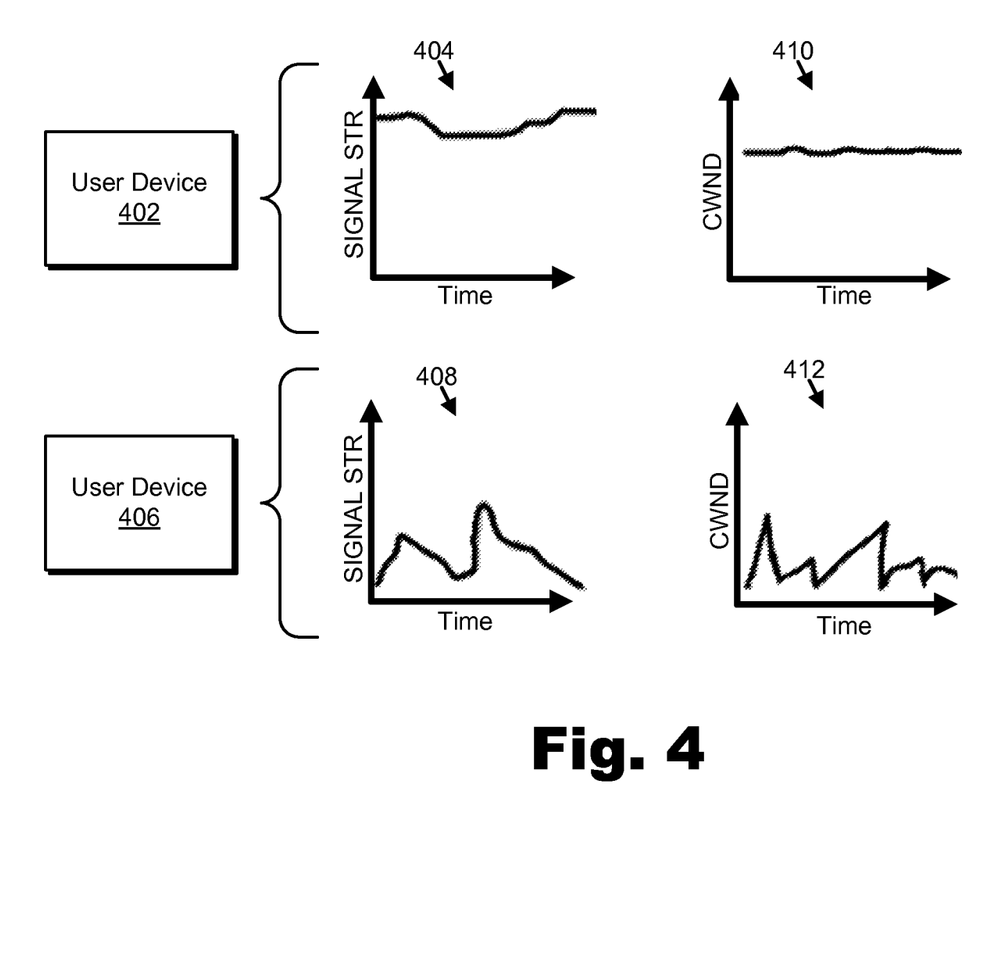
FIG. 4 is a diagram illustrating an example of an effect of varying radio signal quality on parameters relating to congestion control according to principles described herein.

FIG. 4 is a diagram illustrating an example of an effect of varying radio signal quality on parameters relating to congestion control for conventional TCP congestion control mechanisms. As illustrated, assume that a first user device 402 is associated with relatively consistent radio signal strength (SIGNAL STR), as illustrated by graph 404. A second user device 406 may be associated with a signal having less consistent strength, as illustrated by graph 408. User device 406 may be, for example, in an area with radio interference or be associated with a user that is moving through terrain that affects radio reception.

Graphs 410 and 412 show how the signal strengths associated with the first and second user devices 402 and 406 affect a TCP congestion window ("CWND") used by a TCP sender (e.g., a server such as server 104) to transmit data to user devices 402 and 406. It will be recognized that the changes in the TCP congestion windows illustrated in graphs 410 and 412 are realized in accordance with conventional congestion control mechanisms that reset the TCP congestion window every time there is a lost packet.

As shown in graph 410, the TCP congestion window associated with the relatively consistent signal strength shown in graph 404 may be held at a relatively high and stable level. However, as shown in graph 412, the TCP congestion window associated with the relatively inconsistent signal strength shown in graph 408 may vary significantly as a result of the changes in the signal strength. Such variance may negatively impact throughput of the TCP session with user device 406.

Figure 5:
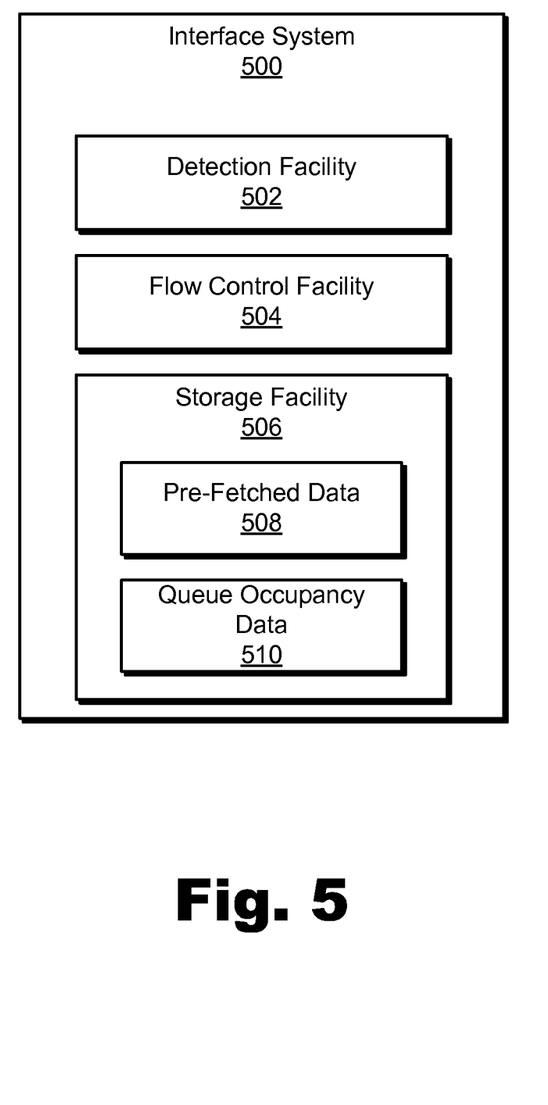
FIG. 5 illustrates an exemplary interface system according to principles described herein.

FIG. 5 illustrates an exemplary interface system 500 that may be used to perform flow control with respect to data being transmitted from a server (e.g., server 104) to a user device (e.g., user device 102) by way of a wireless network (e.g., wireless network 106). As will be described below, the flow control performed by interface system 500 may optimize usage of the available network capacity of the wireless network at any given time, thereby facilitating increased throughput through the wireless network, increased data transmission speeds, and/or improved overall network performance compared to conventional congestion control mechanisms.

As shown, system 500 may include, without limitation, a detection facility 502, a flow control facility 504, and a storage facility 506 selectively and communicatively coupled to one another. It will be recognized that although facilities 502-506 are shown to be separate facilities in FIG. 5, any of facilities 502-506 may be combined into fewer facilities, such as into a single facility, or divided into more facilities as may serve a particular implementation.

Detection facility 502 may detect a request provided by a user device (e.g., user device 102) for a server (e.g., server 104) to transmit data to the user device by way of a base station (e.g., base station 202) and a wireless network (e.g., wireless network 106 or RAN 210) that connects the user device to the base station. This may be performed in any suitable manner. For example, as will be described below, detection facility 502 may be implemented by a TCP acceleration splicing bridge ("TCA device") deployed between the base station and the server. Messages provided by the user device and intended for the server may be routed through the TCA device, which may determine that a particular message includes a request for data maintained by the server. Alternatively, detection facility 502 may be implemented by any of the network elements shown in FIG. 2 and that may detect requests provided by the user device in a similar manner.

Flow control facility 504 may perform one or more flow control operations. For example, in response to a request for a server to transmit data to a user device by way of a wireless network, flow control facility 504 may pre-fetch (i.e., acquire) the requested data from the server. This may be performed in any suitable manner. For example, flow control facility 504 may pre-fetch the data from the server by way of a wireline network that connects interface system 500 to the server. In this manner, flow control facility 504 may pre-fetch the data from the server at or near wire speed so that it is available for transmission by interface system 500 to the base station regardless of the available network capacity of the wireless network that interconnects the base station and the user device. It will be recognized that all of the data may not be pre-fetched by flow control facility 504 before flow control facility 504 begins transmitting the pre-fetched data to the base station (which will be described below). For example, various packets of data may be pre-fetched and buffered by flow control facility 504 as flow control facility 504 transmits other packets of data that have already been pre-fetched from the server.

In some examples, flow control facility 504 may pre-fetch the data from the server by dynamically modifying (e.g., increasing) TCP congestion window values included in messages (e.g., packets) provided by the user device and intended for the server during a TCP session between the user device and the server. For example, during a particular TCP session between the user device and the server, the user device may send a series of messages intended for the server. Each message may include a TCP congestion window value configured to specify a TCP congestion window size that is to be used by the server to transmit packets of data to the user device. For example, the TCP congestion window size may be increased with each sequential message. However, the TCP congestion window sizes specified in the messages may be relatively low, especially at the beginning of the TCP session (e.g., the first TCP congestion window size specified by the user device in a particular TCP session may be 512 bytes).

Hence, in accordance with the methods and systems described herein, the messages intended for the server may be routed through interface system 500. Flow control facility 504 may modify (e.g., increase) the TCP congestion window values included in the messages and then forward the messages with the modified TCP congestion window values to the server. The server may then transmit data to interface system 500 in accordance with the increased TCP congestion window values. In this manner, the data may be transmitted by the server to interface system 500 in a more timely manner (e.g., at or near wire speed).

Flow control facility 504 may modify the TCP congestion window values included in the messages provided by the user device in any suitable manner. For example, flow control facility 504 may maintain a lookup table (which may be hashed on address information such as destination IP address and/or port number included in a message). In some examples, the lookup table may define relationships between incoming and outgoing TCP congestion window values. For example, the lookup table may direct flow control facility 504 to modify an incoming TCP congestion window value of 512 bytes to an outgoing TCP congestion window value of 9216 bytes.

The TCP congestion window values may also be adjusted based on queue occupancy information provided by the base station. For example, flow control facility 504 may dynamically reduce one or more TCP congestion window values in response to queue occupancy information that indicates that the queue being used by the base station to buffer pre-fetched data provided by flow control facility 504 is becoming overfilled. The server will accordingly transmit less data per time segment to flow control facility 504, which may prevent a buffer that is used by flow control facility 504 to store the data before it is transmitted to the base station from overflowing. As another example, flow control facility 504 may dynamically increase one or more TCP congestion window values in response to queue occupancy information that indicates that the queue being used by the base station to buffer pre-fetched data provided by flow control facility 504 is becoming underfilled. The server will accordingly transmit more data per time segment to flow control facility 504, which may allow flow control facility 504 to transmit enough data to the base station to prevent the buffer used by the base station from going into an underfilled state.

These and other manners in which TCP congestion window values may be dynamically modified are described in more detail in co-pending U.S. patent application Ser. No. 13/661,884, filed Oct. 26, 2012, and entitled "WIRESPEED TCP PACKET WINDOW FIELD MODIFICATION FOR NETWORKS HAVING RADIO SEGMENTS," the contents of which are incorporated herein by reference in their entirety.

Flow control facility 504 may be further configured to transmit the pre-fetched data to the base station for forwarding by the base station to the user device by way of the wireless network. This may be performed in any suitable manner. For example, flow control facility 504 may transmit a plurality of packets that comprise the pre-fetched data to the base station.

As the pre-fetched data is being transmitted to the base station, flow control facility 504 may dynamically receive queue occupancy information from the base station. As mentioned, the queue occupancy information is indicative of a congestion level of a queue used by the base station to buffer the pre-fetched data prior to forwarding the pre-fetched data to the user device by way of the wireless network. Flow control facility 504 may use the queue occupancy information to perform flow control with respect to the transmission of the pre-fetched data by flow control facility 504 to the base station.

Figure 6:
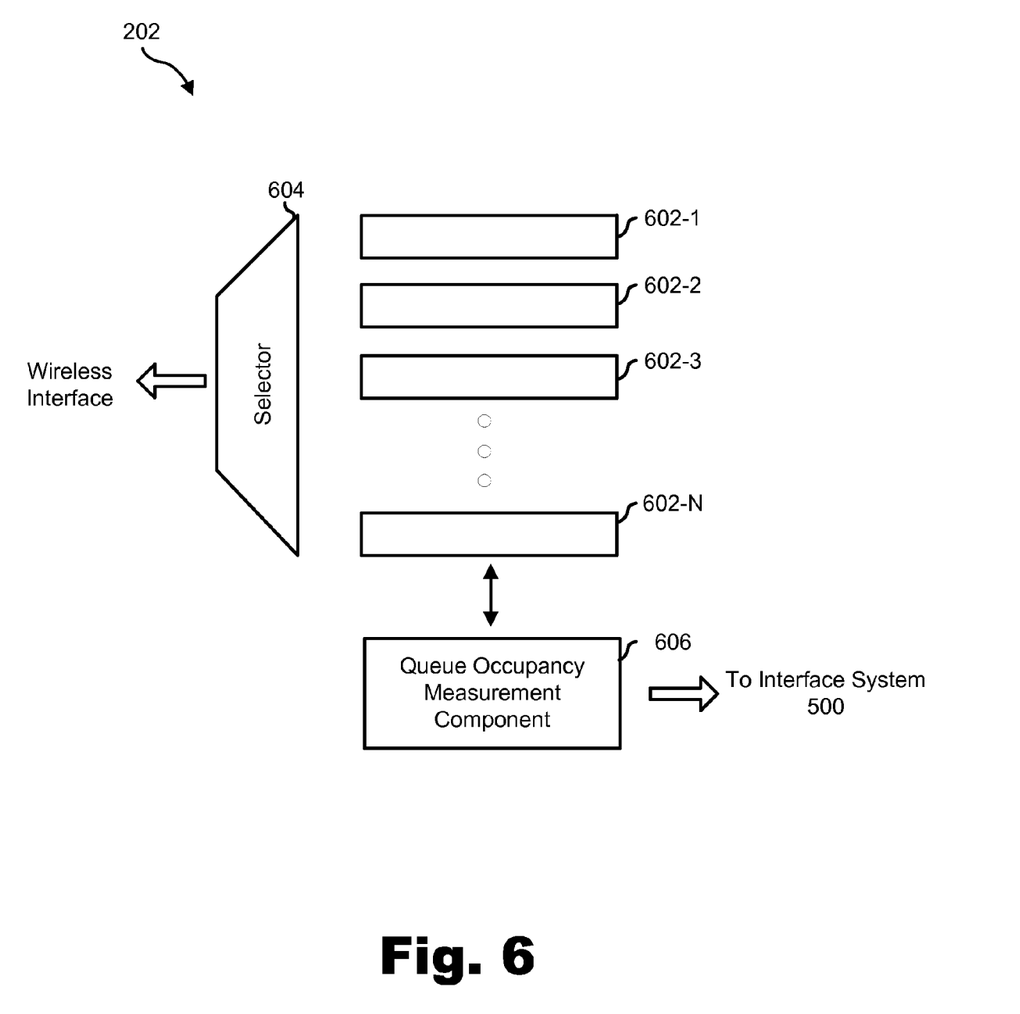
FIG. 6 is a diagram illustrating an example of functional components that may be included in a base station according to principles described herein.

FIG. 6 is a diagram illustrating an example of functional components that may be included in base station 202. As shown, base station 202 may maintain a number of queues 602 (e.g., queues 602-1 through 602-N), a selector 604, and a queue occupancy measurement component 606.

In some examples, each queue 602 may include a first-in first-out ("FIFO") queue that is used to buffer incoming traffic (i.e., data), such as incoming packetized traffic provided by interface system 500, before the traffic is transmitted to a wireless interface (e.g., a RAN interface) of base station 202. In one implementation, queues 602 may be implemented on a per-user device and per-QCI (Quality of Service ("QoS") class identifier) basis. In this implementation, base station 202 may maintain a distinct queue 602 for each traffic flow associated with a particular user device (e.g., user device 102).

Selector 604 may select data, such as packets, from queues 602 for transmission (e.g., to user device 102) over the wireless interface. A number of different selection techniques may be used by selector 604. For example, selector 604 may use a weighted round robin ("WRR") technique, a weighted fair queuing ("WFQ") technique, a low latency queuing ("LLQ") technique, a weighted proportional fairness queuing technique, and/or other queuing technique as may serve a particular implementation. In one implementation, the selection weightings used by selector 604 may be based on an assigned QCI value corresponding to a queue. For instance, higher priority queues 602 may be assigned higher weightings than lower priority queues 602. In this manner, the higher priority queues 602 may be selected more often and may therefore correspond to a higher bandwidth wireless interface.

Queue occupancy measurement component 606 may determine queue occupancy information relating to a current capacity of each queue 602 (i.e., how much data is being buffered at any given time in each queue 602). This may be performed in any suitable manner. For example, in one implementation, queue occupancy measurement component 606 may output a multi-state value indicating a congestion level for each queue 602 (e.g., a one byte value indicating 256 possible states of congestion). In other implementations, queue occupancy measurement component 606 may output, for each queue 602, a two-state (binary) value indicating whether a particular queue 602 is congested or not congested (i.e., whether the congestion level of the particular queue 602 is above or below a predetermined threshold level). In another possible implementation, queue occupancy measurement component 606 may output a three-state value for each queue 602 indicating, for example, whether the congestion for a particular queue 602 is below a first threshold level, above a second threshold level, or in between the first and second threshold level. These and other methods of determining and providing queue occupancy information are described in more detail in co-pending U.S. patent application Ser. No. 13/645,391, filed Oct. 4, 2012, and entitled "TCP FLOW CONTROL OPTIMIZED FOR NETWORKS HAVING RADIO SEGMENTS," the contents of which are incorporated herein by reference in their entirety.

The base station may transmit the queue occupancy information to flow control facility 504 in any suitable manner. For example, the base station may transmit the queue occupancy information to flow control facility 504 periodically, every time the queue occupancy information changes, and/or in any other manner as may serve a particular implementation.

In some examples, the base station may include the queue occupancy information in a matrix of queue occupancy information corresponding to a plurality of TCP sessions (e.g., TCP sessions associated with other user devices communicating by way of the base station). Flow control facility 504 may receive the matrix, determine a hash value based on one or more parameters associated with the TCP session between the user device and the server, and use the hash value to locate, within the matrix, the queue occupancy information corresponding the TCP session between the user device and the server. This is described in more detail in the above-referenced U.S. patent application Ser. No. 13/645,391.

Flow control facility 504 may use the queue occupancy information to perform flow control with respect to the transmission of the pre-fetched data to the base station in any suitable manner. For example, flow control facility 504 may adjust a rate at which the pre-fetched data is transmitted to the base station in accordance with the queue occupancy information.

To illustrate, the queue occupancy information may indicate a decrease in the congestion level of the queue used by the base station to buffer the pre-fetched data prior to forwarding the pre-fetched data to the user device. In response, flow control facility 504 may increase the rate at which the pre-fetched data is transmitted to the base station (e.g., by an amount specified in a lookup table or the like). The rate may be increased, for example, by dynamically increasing a TCP congestion window size associated with the transmission of the pre-fetched data to the base station.

As another example, the queue occupancy information may indicate an increase in the congestion level of the queue used by the base station to buffer the pre-fetched data prior to forwarding the pre-fetched data to the user device. In response, flow control facility 504 may decrease the rate at which the pre-fetched data is transmitted to the base station (e.g., by an amount specified in a lookup table or the like). The rate may be decreased, for example, by dynamically decreasing a TCP congestion window size associated with the transmission of the pre-fetched data to the base station.

As another example, the queue occupancy information may indicate that the congestion level of the queue is above a threshold level. In response, flow control facility 504 may refrain from transmitting the pre-fetched data while the congestion level of the queue is above the threshold level. The congestion level of the queue may subsequently decrease to below the threshold level. In response to this change, flow control facility 504 may resume transmitting the pre-fetched data to the base station.

As another example, the queue occupancy information may indicate that the congestion level of the queue falls within one of three categories: a low congestion level (i.e., below a first threshold level), a high congestion level (i.e., above a second threshold level), or a medium congestion level (i.e., in between the first and second threshold levels). Flow control facility 504 may be configured to increase the rate at which the pre-fetched data is transmitted to the base station when the congestion level is below the first threshold level, decrease the rate at which the pre-fetched data is transmitted to the base station when the congestion level is above the second threshold level, and maintain the rate at which the pre-fetched data is transmitted to the base station when the congestion level is in between the first and second threshold levels.

It will be recognized that the examples provided above of performing flow control in accordance with queue occupancy information are merely illustrative of the many different manners in which the queue occupancy information may be used by flow control facility 504 to perform flow control with respect to the pre-fetched data that is transmitted to the base station.

Figure 7:
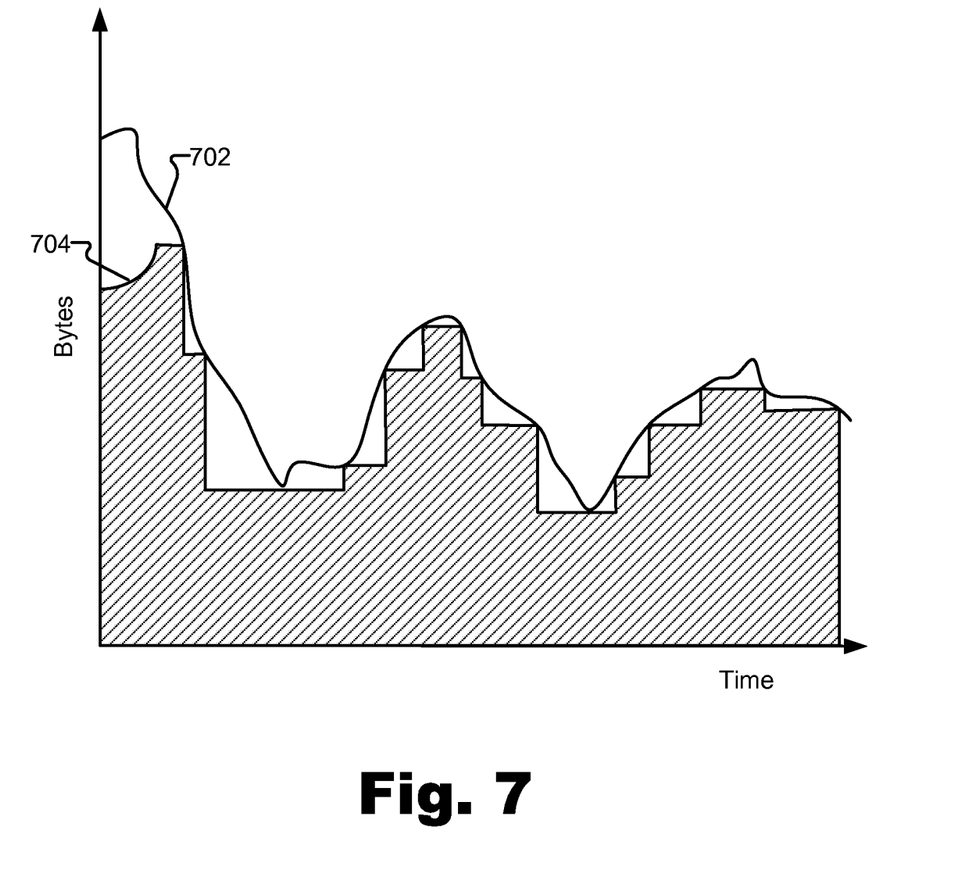
FIG. 7 shows a graph of network capacity of a wireless network that interconnects a user device and a base station according to principles described herein.

As described above, the flow control performed by flow control facility 504 may ensure that the queue used by the base station is always at an optimal level (i.e., not underfilled or overfilled, which may result in reduced network throughput). To illustrate, FIG. 7 shows a graph 702 of network capacity of a wireless network that interconnects a user device and a base station (e.g., wireless network 106). As shown, the network capacity may vary greatly over time. FIG. 7 also shows a graph 704 of actual network throughput that may be realized in accordance with the methods and systems described herein. As illustrated, the actual throughput closely tracks the actual network capacity, thereby resulting in a relatively small amount of unutilized network capacity 702.

In some examples, the amount of data that flow control facility 504 pre-fetches may be based on one or more buffer size allocations of the buffer that flow control facility 504 uses to store the pre-fetched data before it is transmitted to the base station. For example, flow control facility 504 may pre-fetch enough data to buffer enough data to absorb fluctuations in the network capacity of the wireless network such that the queue maintained by the base station is never underfilled or overfilled. To illustrate, flow control facility 504 may pre-fetch enough data for flow control facility 504 to ensure that the queue maintained by the base station is around seventy-five percent full.

In some examples, it may be beneficial for interface system 500 to perform the flow control described herein as opposed to the server (e.g., server 104) performing the flow control. For example, by having interface system 500 perform the flow control, the server does not have to be configured (e.g., by installing one or more applications on the server) to perform the flow control. This may allow the methods and systems described herein to be used in connection with any server, regardless of the server's flow control capabilities.

Returning to FIG. 5, storage facility 506 may be configured to store pre-fetched data 508 acquired by flow control facility 504 and queue occupancy data representative of queue occupancy information received by flow control facility 504 from the base station. Storage facility 506 may maintain additional or alternative data as may serve a particular implementation.

Interface system 500 may be implemented by one or more of the network elements described herein. For example, MME 204, SGW 206, and/or PGW 208 may implement interface system 500. Additionally or alternatively, interface system 500 may be implemented by a separate device spliced into the TCP transport channel that interconnects user device 102 and server 104.

Figure 8:
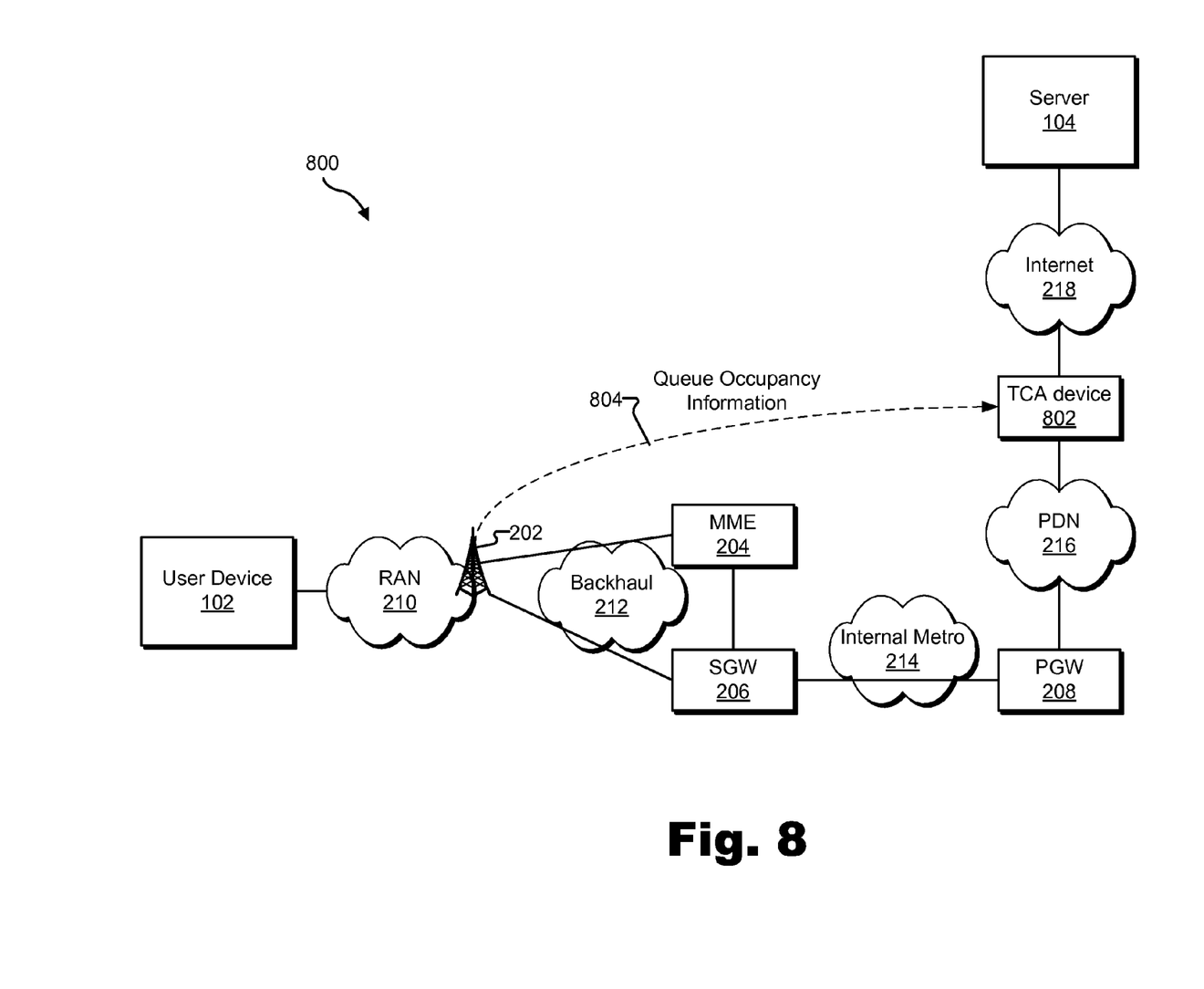
FIG. 8 illustrates an exemplary implementation of the interface system of FIG. 5 according to principles described herein.

To illustrate, FIG. 8 illustrates an exemplary configuration 800 in which interface system 500 is implemented entirely by a TCA device 802 spliced into the TCP transport channel that interconnects user device 102 and server 104. As shown, TCA device 802 is deployed between PDN network 216 and the Internet 218. However, it will be recognized that TCA device 802 may be deployed at any other suitable location along the TCP transport channel.

With reference to FIG. 8, base station 202 may connect to user device 102 by way of RAN 210 and maintain a queue that buffers data traffic destined for user device 102. TCA device 802 may detect a request provided by user device 102 for server 104 to transmit data to user device 102 by way of base station 202 and RAN 210, pre-fetch the data from server 104 in response to the request, and transmit the pre-fetched data to base station 202. Base station 202 may store the pre-fetched data in the queue, forward the pre-fetched data stored in the queue to user device 102 at a rate dictated at least in part by a network capacity of RAN 210, and, as indicated by data flow 804, continuously provide TCA device 802 with queue occupancy information indicative of a congestion level of the queue while TCA device 802 transmits the pre-fetched data to base station 202. TCA device 802 may use the queue occupancy information to perform flow control with respect to the transmission of the pre-fetched data by TCA device 802 to base station 202. This may be performed in any of the ways described herein.

In some examples, TCA device 802 (and any other implementation of interface system 500) may be implemented in hardware, such as through the use of an application-specific integrated circuit ("ASIC"), a field-programmable gate array ("FPGA"), or any other suitable network processor. Advantageously, TCA device 802 may execute at wire speed (or near wire speed) and thus introduce relatively little latency into the TCP session. Moreover, TCA device 802 may be implemented without terminating a socket connection between user device 102 and TCA device 802 and between TCA device 802 and server 104. This may be advantageous from a performance and scalability perspective.

Figure 9:
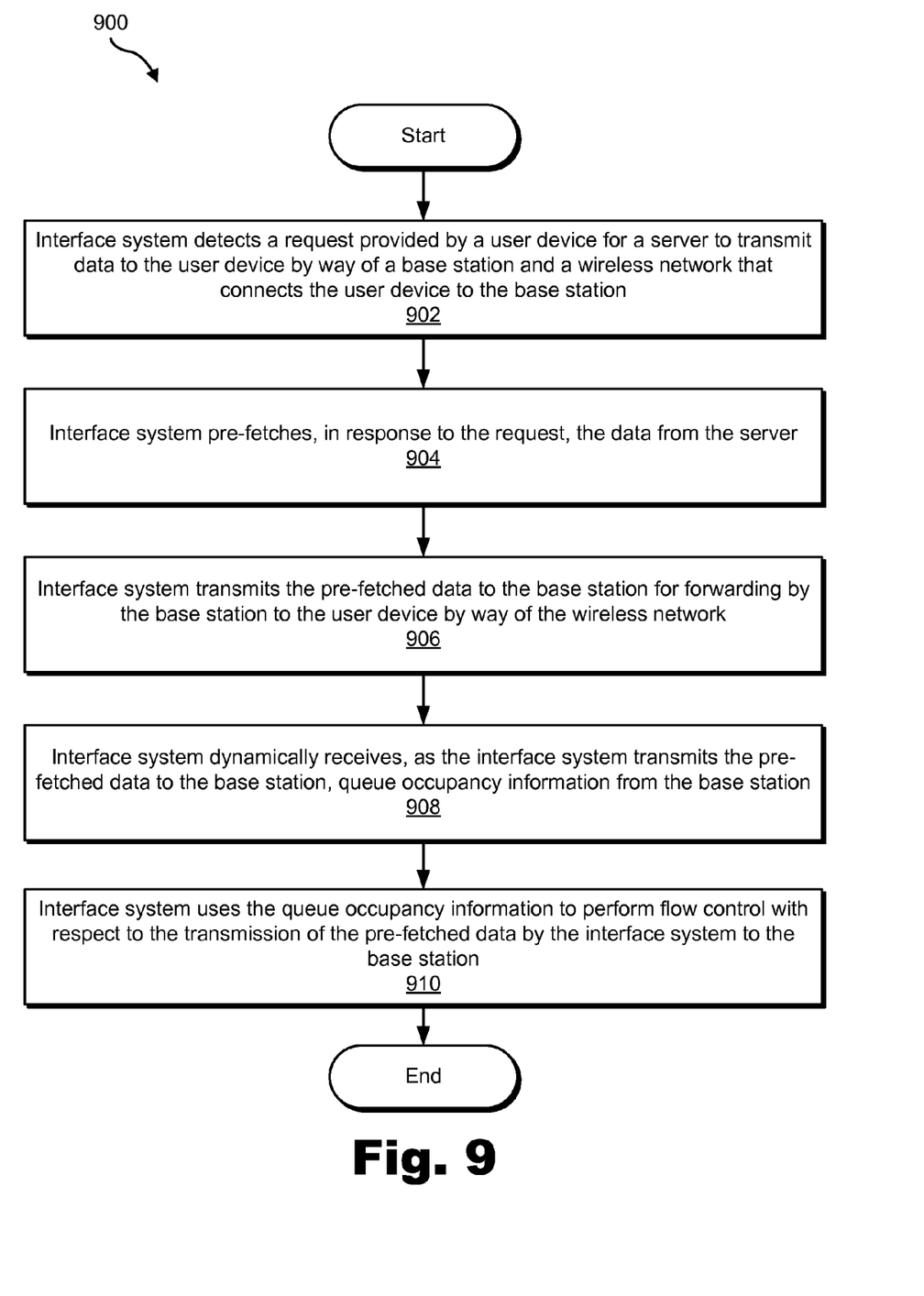
FIG. 9 illustrates an exemplary flow control method for use with a wireless network according to principles described herein.

FIG. 9 illustrates an exemplary flow control method 900 for use with a wireless network. While FIG. 9 illustrates exemplary steps according to one embodiment, other embodiments may omit, add to, reorder, and/or modify any of the steps shown in FIG. 9. One or more of the steps shown in FIG. 9 may be performed by interface system 500 and/or any implementation thereof.

In step 902, an interface system detects a request provided by a user device for a server to transmit data to the user device by way of a base station and a wireless network that connects the user device to the base station. Step 902 may be performed in any of the ways described herein.

In step 904, the interface system pre-fetches, in response to the request, the data from the server. Step 902 may be performed in any of the ways described herein.

In step 906, the interface system transmits the pre-fetched data to the base station for forwarding by the base station to the user device by way of the wireless network. Step 906 may be performed in any of the ways described herein.

In step 908, the interface system dynamically receives, as the interface system transmits the pre-fetched data to the base station, queue occupancy information from the base station. Step 908 may be performed in any of the ways described herein.

In step 910, the interface system uses the queue occupancy information to perform flow control with respect to the transmission of the pre-fetched data by the interface system to the base station. Step 910 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
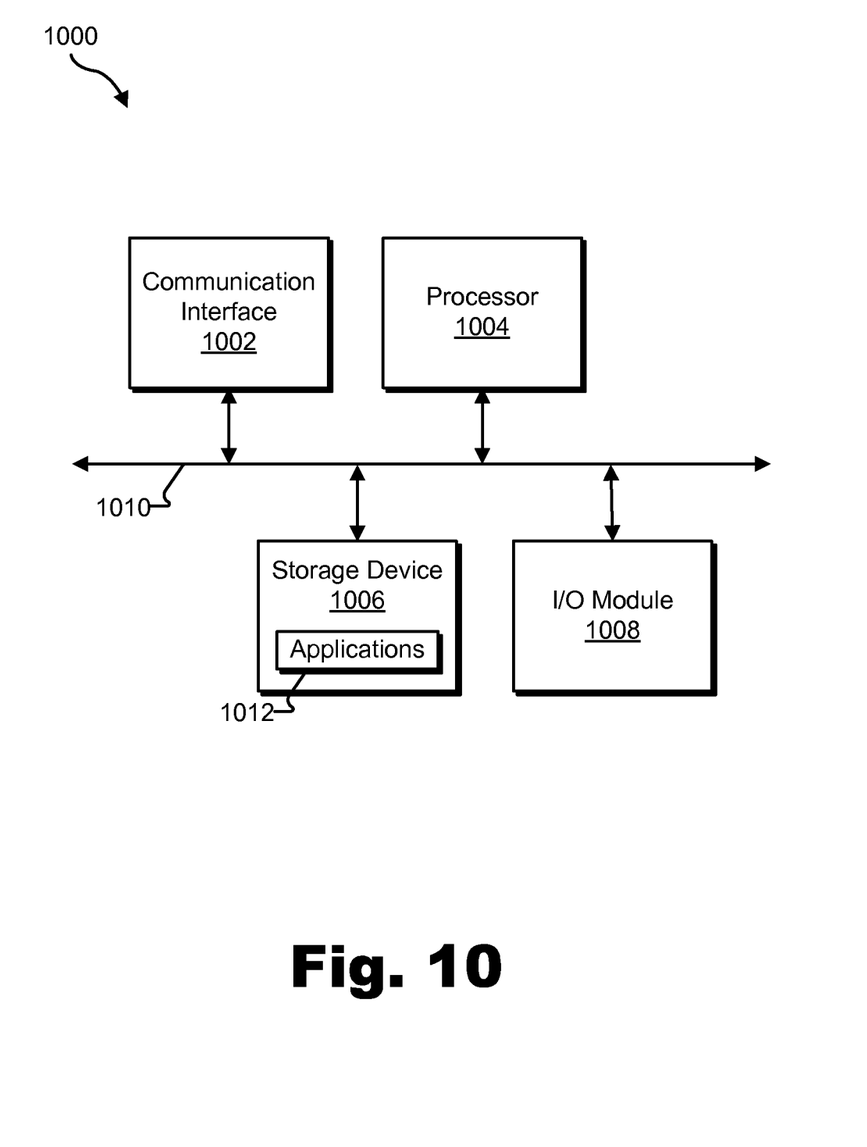
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1000. For example, one or more applications 1012 residing within storage device 1006 may be configured to direct processor 1004 to perform one or more processes or functions associated with detection facility 502 and/or flow control facility 504. Likewise, storage facility 506 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by an interface system, a request provided by a user device for a server to transmit data to the user device by way of a base station and a wireless network that connects the user device to the base station;
   pre-fetching, by the interface system in response to the request, the data from the server;
   transmitting, by the interface system, the pre-fetched data to the base station for forwarding by the base station to the user device by way of the wireless network;
   dynamically receiving, by the interface system as the interface system transmits the pre-fetched data to the base station, a matrix of queue occupancy information from the base station, wherein the queue occupancy information is indicative of a congestion level of a queue used by the base station to buffer the pre-fetched data prior to forwarding the pre-fetched data to the user device by way of the wireless network and wherein the queue occupancy information corresponds to a plurality of transmission control protocol ("TCP") sessions, the plurality of TCP sessions including a TCP session between the user device and the server; and
   using, by the interface system, the queue occupancy information to perform flow control with respect to the transmission of the pre-fetched data by the interface system to the base station.

2. The method of claim 1, wherein the using of the queue occupancy information to perform flow control comprises dynamically adjusting, in accordance with the queue occupancy information, a rate at which the pre-fetched data is transmitted to the base station.

3. The method of claim 2, wherein the queue occupancy information indicates a decrease in the congestion level of the queue, and wherein the dynamically adjusting comprises increasing the rate at which the pre-fetched data is transmitted to the base station in response to the decrease in the congestion level of the queue.

4. The method of claim 2, wherein the queue occupancy information indicates an increase in the congestion level of the queue, and wherein the dynamically adjusting comprises decreasing the rate at which the pre-fetched data is transmitted to the base station in response to the increase in the congestion level of the queue.

5. The method of claim 2, wherein the dynamically adjusting of the rate at which the pre-fetched data is transmitted to the base station comprises dynamically adjusting a TCP congestion window size associated with the transmission of the pre-fetched data to the base station.

6. The method of claim 1, wherein the queue occupancy information indicates that the congestion level of the queue is above a threshold level, and wherein the using of the queue occupancy information to perform flow control comprises refraining from transmitting the pre-fetched data while the congestion level of the queue is above the threshold level.

7. The method of claim 6, wherein the queue occupancy information indicates that the congestion level of the queue has changed from being above the threshold level to being below the threshold level, and wherein the using of the queue occupancy information to perform flow control further comprises resuming the transmission of the pre-fetched data in response to the change in the congestion level.

8. The method of claim 1, wherein the queue occupancy information indicates that the congestion level of the queue is below a first threshold level, above a second threshold level, or in between the first and second threshold levels, and wherein the using of the queue occupancy information to perform flow control comprises:
   increasing a rate at which the pre-fetched data is transmitted to the base station when the congestion level is below the first threshold level;
   decreasing the rate at which the pre-fetched data is transmitted to the base station when the congestion level is above the second threshold level; and
   maintaining the rate at which the pre-fetched data is transmitted to the base station when the congestion level is in between the first and second threshold levels.

9. The method of claim 1, wherein the pre-fetching of the data from the server comprises:
   receiving a message provided by the user device and comprising a TCP congestion window value;
   modifying the TCP congestion window value; and forwarding the message containing the modified TCP congestion window value to the server for use by the server in transmitting the requested data to the interface system.

10. The method of claim 1, wherein the pre-fetching comprises pre-fetching the data from the server by way of a wireline network that connects the interface system to the server.

11. The method of claim 1, wherein the pre-fetching of the data from the server and the transmitting of the pre-fetched data to the base station are performed by the interface system without the interface system terminating a socket connection between the user device and the interface system and between the interface system and the server.

12. The method of claim 1, wherein the transmitting of the pre-fetched data to the base station comprises transmitting a plurality of packets that comprise the pre-fetched data to the base station.

13. The method of claim 1, wherein the request provided by the user device for the server to transmit data to the user device comprises a request to transmit the data by way of the TCP session established between the user device and the server.

14. The method of claim 1, embodied as computer-executable instructions on at least one non-transitory computer-readable medium.

15. A method comprising:
 detecting, by an interface system, a request provided by a user device for a server to transmit data to the user device by way of a base station and a wireless network that connects the user device to the base station;
 pre-fetching, by the interface system in response to the request, the data from the server;
 transmitting, by the interface system, the pre-fetched data to the base station for forwarding by the base station to the user device by way of the wireless network;
 dynamically receiving, by the interface system as the interface system transmits the pre-fetched data to the base station, queue occupancy information from the base station, the queue occupancy information corresponding to a TCP session between the user device and the server and indicative of a congestion level of a queue used by the base station to buffer the pre-fetched data prior to forwarding the pre-fetched data to the user device by way of the wireless network; and
 using, by the interface system, the queue occupancy information to perform flow control with respect to the transmission of the pre-fetched data by the interface system to the base station,
 wherein the dynamically receiving of the queue occupancy information comprises:
  receiving a matrix of queue occupancy information corresponding to a plurality of transmission control protocol ("TCP") sessions, the plurality of TCP sessions including the TCP session between the user device and the server;
  determining a hash value based on one or more parameters associated with the TCP session between the user device and the server; and
  using the hash value to locate, within the matrix, the queue occupancy information corresponding the TCP session between the user device and the server.

16. A system comprising:
 a detection facility that detects a request provided by a user device for a server to transmit data to the user device by way of a base station and a wireless network that connects the user device to the base station; and
 a flow control facility communicatively coupled to the detection facility and that
  pre-fetches, in response to the request, the data from the server,
  transmits the pre-fetched data to the base station for forwarding by the base station to the user device by way of the wireless network,
  dynamically receives, as the pre-fetched data is transmitted to the base station, a matrix of queue occupancy information from the base station, wherein the queue occupancy information is indicative of a congestion level of a queue used by the base station to buffer the pre-fetched data prior to forwarding the pre-fetched data to the user device by way of the wireless network and wherein the queue occupancy information corresponds to a plurality of transmission control protocol ("TCP") sessions, the plurality of TCP sessions including a TCP session between the user device and the server, and
  uses the queue occupancy information to perform flow control with respect to the transmission of the pre-fetched data by the flow control facility to the base station.

17. The system of claim 16, wherein the flow control facility uses the queue occupancy information to perform flow control by dynamically adjusting, in accordance with the queue occupancy information, a rate at which the pre-fetched data is transmitted to the base station.

18. The system of claim 17, wherein the queue occupancy information indicates a decrease in the congestion level of the queue, and wherein the flow control facility dynamically adjusts the rate by increasing the rate at which the pre-fetched data is transmitted to the base station in response to the decrease in the congestion level of the queue.

19. The system of claim 17, wherein the queue occupancy information indicates an increase in the congestion level of the queue, and wherein the flow control facility dynamically adjusts the rate by decreasing the rate at which the pre-fetched data is transmitted to the base station in response to the increase in the congestion level of the queue.

20. A system comprising:
 an evolved node B ("eNodeB") device that
  connects to a user device by way of a radio active network, and
  maintains a queue that buffers data traffic destined for the user device; and
 a transmission control protocol acceleration splicing bridge device ("TCA device") communicatively coupled to the eNodeB device and to a server and that
  detects a request provided by the user device for the server to transmit data to the user device by way of the eNodeB device and the radio active network,
  pre-fetches, in response to the request, the data from the server, and
  transmits the pre-fetched data to the eNodeB device;
 wherein the eNodeB device further
  stores the pre-fetched data in the queue,
  forwards the pre-fetched data stored in the queue to the user device, and
  continuously provides, while the TCA device transmits the pre-fetched data to the eNodeB device, the TCA device with a matrix of queue occupancy information, wherein the queue occupancy information is indicative of a congestion level of the queue and wherein the queue occupancy information corresponds to a plurality of transmission control protocol ("TCP") sessions, the plurality of TCP sessions including a TCP session between the user device and the server; and wherein the TCA device further uses the queue occupancy information to perform flow control with respect to the transmission of the pre-fetched data by the TCA device to the eNodeB device.

* * * * *